United States Patent [19]
Izumi et al.

[11] 3,890,550
[45] June 17, 1975

[54] DIFFERENTIAL AMPLIFIER CIRCUIT FOR SERVO SYSTEM

[75] Inventors: Hideo Izumi; Toshikazu Ichiyanagi, both of Tokyo, Japan

[73] Assignee: Canon Kabushiki Kaisha, Tokyo, Japan

[22] Filed: May 25, 1972

[21] Appl. No.: 256,819

[30] Foreign Application Priority Data
May 28, 1971  Japan.............................. 46-36801

[52] U.S. Cl................ 318/678; 318/681; 318/640; 318/599; 95/10 CD
[51] Int. Cl..................................... G05f 1/00
[58] Field of Search............ 318/599, 608, 624, 640, 318/674, 678, 681, 341, 610; 95/10 CD

[56] References Cited
UNITED STATES PATENTS

| | | | |
|---|---|---|---|
| 2,588,742 | 3/1952 | McCallum | 318/608 |
| 2,780,763 | 2/1957 | Hertwig | 318/341 X |
| 3,280,781 | 10/1966 | Koerner | 318/624 X |
| 3,427,941 | 2/1969 | Metzger | 318/640 X |
| 3,430,053 | 2/1969 | Westhaver | 318/640 X |
| 3,431,475 | 3/1969 | Wesner | 318/624 |
| 3,584,208 | 6/1971 | Slawson | 318/610 X |

*Primary Examiner*—T. E. Lynch
*Attorney, Agent, or Firm*—Flynn & Frishauf

[57] ABSTRACT

This invention provides an electric circuit for servo system which enables accurate and precise adjustment of the exposure value in response to the brightness of an object to be photographed even if the brightness of the object changes over a wide range. A mechanical transducer is used for driving a diaphragm device. Intermittent drive currents of forward and backward sense from an astable multivibrator are fed to the transducer, the drive voltage of the astable multivibrator being intermitted by a switching circuit, the dead zone of which is adjusted and controlled by a photoelectric transducer element which measures the brightness of an object. The opening of the diaphragm device is determined by the quantity of feedback and when the measurement of the measuring element reaches a desired value, the astable multivibrator is deactivated via the switching circuit so as to stop the supply of the intermittent pulses to the transducer.

10 Claims, 5 Drawing Figures

DIFFERENTIAL AMPLIFIER CIRCUIT FOR SERVO SYSTEM

BACKGROUND OF THE INVENTION

1. Field of the Invention

The present invention relates to an electric circuit for servo system, especially suitable for a transistor circuit to be integrated therein.

2. Description of the Prior Art

Servo systems, particularly automatic servo systems, have conventionally been utilized for various purposes such as controlling the position of an object, the velocity of a moving body, the temperature of a substance, etc. Generally, the mechanism of the conventional servo system is that a transducer, such as a motor, to vary the variable to be controlled is driven by the output of a servo circuit, the quantity driven by the transducer is fed back to the servo circuit to be compared with a preset value or a control input signal value, and when there is no difference between them, the transducer is stopped to set the controlled variable to a required value. For example, for adjusting the diaphragm opening or shutter speed of a photographic camera for automatically setting it to a value suitably corresponding to the brightness of an object to be photographed, a servo system may be employed generally in a manner that a photo conductive element to measure the brightness of the object to be photographed and to convert it into a change in electric resistance is provided in one of the arms of a bridge circuit, and a resistor to set the value of an ASA sensitivity or other exposure determining factor is connected in another arm of the bridge circuit, the bridge circuit being further combined with an amplifier to amplify the output of the bridge circuit, a switching circuit to switch the output, and a servomotor to be driven by the output of the switching circuit, the servomotor being coupled to drive a diaphragm operating device or shutter speed varying device of the camera for setting a required exposure (as disclosed, for example, in the U.S. Pat. No. 3,450,969). With such a conventional servo system it is difficult, when the variable component to be servo-controlled has an appreciable mechanical inertia force, to servo-control the component precisely to a required value because of the force of inertia. Also, with the system it is extremely difficult to set the component to a precise value, since the operating point of the servo circuit deviates when the ambient temperature largely changes.

SUMMARY OF THE INVENTION

The object of the present invention is to provide an electric circuit capable of overcoming the above-mentioned drawback of the conventional servo system.

According to the present invention, a bias varying means such as a variable resistor which is pre-adjustable is connected to one of the differential inputs of a pair of differential amplifier circuits, a pair of control input signals is applied to the other differential input, and a pair of switching means is selectively operated by the outputs of the respective differential circuits for making the respective switching means drive and control a servo transducer means such as a motor. It should be noted here that the present invention provides an electric circuit for a servo system which is capable of effecting a desired servo performance by pre-adjusting the dead zone of each of the above-mentioned switching means by means of the aforementioned bias varying means. It should further be noted that the present invention provides an electric circuit as mentioned above which may be used in a servo system of the exposure control circuit of a photographic camera or other device for providing it with an extremely desirable servo system.

According to the prior art of photographic camera and cinecamera, in order to adjust automatically the opening of the diaphragm or shutter device of the camera as a function of the brightness of an object to be photographed for obtaining a suitable film exposure, a photocell or photo conductive element measures the brightness of the object and converts it into an electric signal is connected to a galvanometer, and the position of the pointer of the galvanometer is scanned or the pointer itself is directly coupled with the diaphragm or shutter device for automatically adjusting the opening of the diaphragm or shutter device of the camera, as well known.

In the known technique as described above, however, it has been very difficult to effect accurate and precise adjustment in response to the brightness of the object if the brightness changes over a wide range.

One prior proposal to eliminate such disadvantage of the conventional system is that the diaphragm device or shutter aperture adjusting device is mechanically coupled with and driven by a servomotor, the servomotor being driven by a driving circuit which is controlled by the photo-electric transducer element provided for measuring the brightness of the object, thereby obtaining an opening suitable for the brightness of the object. This system of using a servomotor to mechanically drive the diaphragm device or shutter opening adjusting device for obtaining a desired exposure, as well as the aforementioned system of using a galvanometer, is required to have the mechanism to be driven by the servomotor, or the galvanometer in the latter case, driven by overcoming its statical friction at the time of start. For this reason the response characteristic of the mechanism is bad, in some cases disabling the mechanism to start because of an insufficient driving force, which in turn fails to effect accurate adjustment. Furthermore, once started, the mechanism operates with its kinetic friction which is much smaller than the statical friction; therefore, if a driving force greater than necessary is applied to the mechanism at the time of start, the friction of the mechanism greatly decreased after the start will result in an excessive drive of the mechanism, incapacitating the mechanism from adjusting the diaphragm or shutter device for an accurate and precise exposure.

One proposal to overcome the above-mentioned drawback, for example, as disclosed in the specification of the U.S. Pat. No. 3,427,941, is to apply pulses of forward and backward senses to the mechanical transducer such as galvanometer or servomotor by means of an astable multivibrator, whereby when the durations of the forward and backward pulses equal each other, the transducer is neutralized, thereby setting the mechanism for a desired exposure.

According to the system disclosed as above, the transducer is uninterruptedly driven in either direction with the forward and backward pulses; therefore, slight differences in the duration of forward or backward pulse cause the transducer to vibrate, which in turn finely fluctuates the shutter aperture while the shutter of the camera is being actuated for film exposure, failing to expose the film as accurately as desired. Also, although the transducer assumes a state of equilibrium after a start while forward and backward pulses are applied to the transducer without interruption, continuation of this condition requires otherwie unnecessary electric power to be consumed, making the system disadvantageous also in this respect.

Another object of the present invention is to overcome the above-mentioned conventional drawbacks. The present invention is characterized in that a mechanical transducer to drive a diaphragm device or shutter opening adjusting device is fed with intermittent drive currents of forward and backward sense from an astable multivibrator, the drive voltage of the astable multivibrator being intermitted by a switching circuit the dead zone of which is adjusted as mentioned previously and which is controlled by a photo-electric transducer element which measures the brightness of the object to be photographed, whereby when the opening of the diaphragm or shutter device, which is determined by the quantity of feedback and the measurement of the measuring element, reaches a desired value, the astable multivibrator is deactivated via the switching circuit, thereby stopping the supply of the intermittent pulses which have been applied to the transducer.

Another object of the present invention is to provide a servo system for exposure control device which is capable of effecting high-precision exposure adjustment against temperature fluctuations and has a circuit composition suitable for semiconductor integrated-circuit technique.

The above objects and other objects of the present invention will better be understood by reading the following which explains exemplary embodiments of the present invention by referring to the attached drawings wherein:

DESCRIPTION OF THE PREFERRED EMBODIMENT

Figure 1:
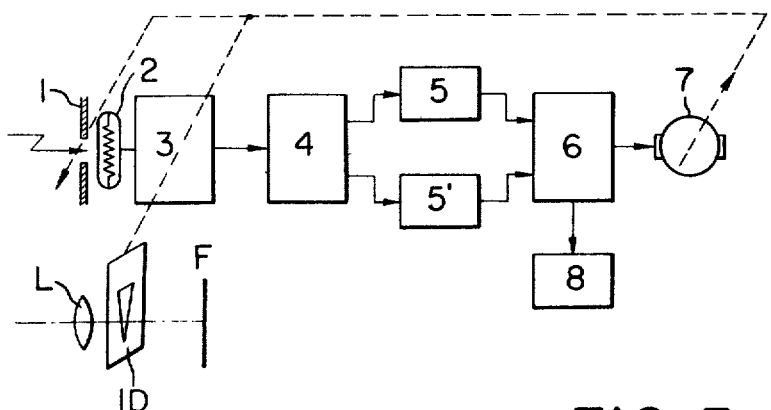
FIG. 1 shows an overall block diagram of an exposure control device of a photographic camera using an electric circuit for servo system according to the present invention.
Figure 2:
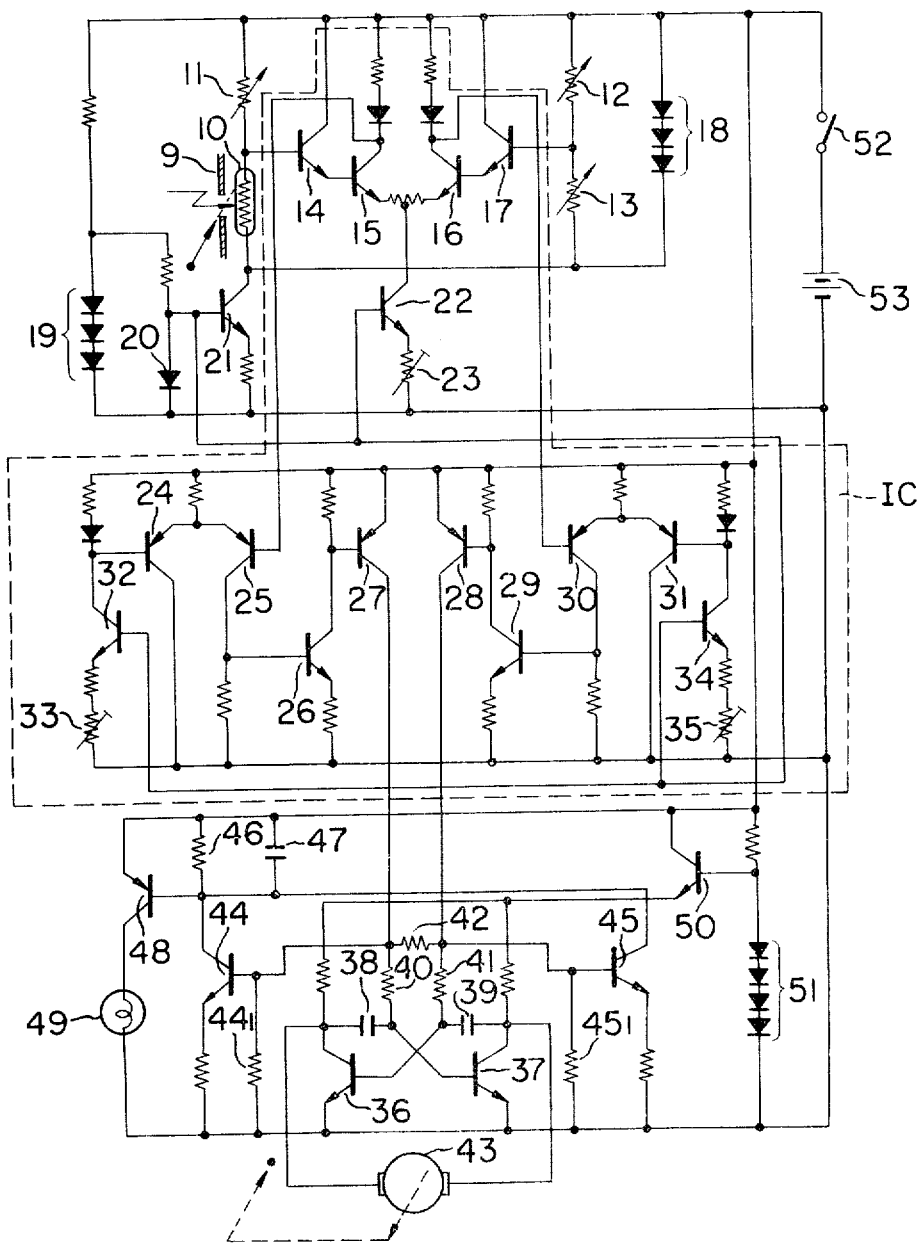
FIG. 2 shows a schematic electric circuit diagram for embodiment of the exposure control device illustrated in FIG. 1.

Referring to FIGS. 1 and 2, which illustrate an embodiment of the present invention for use with an exposure control device of a photographic camera, a diaphragm mechanism 1 may be of a known design. A photosensitive element 2 may be a photoelectric conductive element, which can be used in one of the arms of a bridge circuit. A bridge circuit 3 comprises arms of resistance elements with which film sensitivity, shutter speed and other photographic information will be set. Block 4 represents a differential detector circuit. Switching circuits 5 and 5' include a reference potential setting circuit, respectively, and effect their switching operation according to the output of the detector circuit 4. An astable multivibrator 6 oscillates, stops oscillating or changes the pulse duration of its oscillating waveform, depending on the switching operation of the switching circuit 5 or 5'. A servomotor 7 varies the automatic diaphragm device 1 and balances the bridge circuit. Block 8 represents an indicator circuit. The servomotor 7 drives the diaphragm device 1 which is located in front of the photosensitive element 2, and also cooperates with another diaphragm device 1D, which is arranged along the optical path of a photographic lens L, for limiting exposure on the surface of photographic film F.

Light from an object is incident upon the photosensitive element 2 through the diaphragm device 1, giving a resistance of the element 2 corresponding to the intensity of the incident light. This resistance and the resistances set with other branches of the bridge circuit corresponding to photographic information produce an unbalance output from the output of the bridge circuit 3. Depending on the polarity of the unbalance output, one of the switching circuits 5 and 5' connected to the outputs of the differential detector circuit 4 is turned on, which in turn actuates the astable multivibrator 6 to oscillate. The pulse duration of the oscillating waveform is variable depending on whether the switching circuit 5 or 5' is turned on. This causes an intermittent current to flow in the servomotor connected to the output of the multivibrator for turning the servomotor in the forward or backward direction. The servomotor thus turned drives the diaphragm mechanism and simultaneously changes the state of the bridge circuit in the direction of equilibrium. When the bridge circuit assumes the state of equilibrium there is no output from either of the differential detector circuit, which turns off both the switching circuits 5 and 5', which in turn causes the multivibrator to cease oscillation, therefore stopping the motor. The output of the multivibrator may partially be supplied to the indicator circuit 8 so as to light a lamp during oscillation of the multivibrator and to extinguish the lamp at the time of the oscillation being stopped, thereby indicating the state of the bridge circuit, by which whether the automatic diaphragm device is within or out of its operating range can be displayed.

Referring to FIG. 2, which is a schematic circuit diagram for embodying the concept of the present invention illustrated in FIG. 1, a diaphragm mechanism 9 is driven by a servomotor 43 for changing the quantity of the light incident upon the photosensitive element. A photo conductive element 10 and variable resistors 11, 12 and 13 form a bridge circuit, the variable resistors 11, 12 and 13 being used for setting ASA sensitivity, shutter speed and other photographic information. Transistors 14, 15, 16 and 17 form a differential detector circuit, diodes 18 are provided for stabilizing the voltage of the bridge circuit, diodes 19 and 20 are provided for stabilizing the voltage of a constant current circuit, transistors 21 and 22 form the constant current circuit, and a variable resistor 23 is provided for setting the operating point of the differential circuit. The above components form circuits corresponding to the blocks 1 through 4 of the block diagram in FIG. 1. Transistors 24 through 27 and transistors 28 through 31 compose a pair of switching circuits (blocks 5 and 5' in FIG. 1), the transistors 25 and 31 being the input stage of the circuits, respectively, and the transistors 27 and 28 being the output stage, respectively. Transistors 32 and 34 compose circuits to supply the transistors 24 and 31, respectively, with reference voltages for the two switching circuits, respectively. Resistors 33 and 35 are provided for adjusting the dead zone of the transistors 27 and 28 for setting the reference voltages, respectively. Transistors 36 and 37 form an astable multivibrator, capacitors 38 and 39 and resistors 41 and 42 form time constant circuits. A servomotor 43 drives the automatic diaphragm 1 and also the diaphragm device 1D arranged in the photographic optical path of the camera as shown in FIG. 1. Transistors 44 and 45 form an indicator circuit and have low resistors $44_1$ and $45_1$ connected to the bases of the transistors, respectively. Outputs of the transistors 44 and 45 are supplied to a RC circuit comprising a resistor 46 and a capacitor 47, and the output of a transistor 48 lights and distinguishes a display lamp 49. A transistor 50 and diodes 51 compose a constant current circuit for the multivibrator circuit. A power switch 52 turns on and off a power supply battery 53.

The circuit as illustrated in FIG. 2 and described above operates as follows: The resistors 33 and 35 are set to predetermined values beforehand. These values must be experimentally determined by taking into consideration the inertia force of the diaphragm device of the camera driven and controlled by the servomotor 43, the starting and stopping characteristics of the motor 43, etc., so that the diaphragm opening may reach a required extent within a certain operating time when the light incident on the photosensitive element from the object to be photographed changes quickly. For example, if the diaphragm has a large force of inertia, the resistors 33 and 35 should be adjusted so that the transistor 25 or 31 may assume the off state a little earlier by which the diaphragm device will be accurately set to a required value by the inertia force of the diaphragm device itself. When photographic information such as film sensitivity and shutter speed is set with the variable resistors 11, 12 and 13 in the bridge circuit and then the light from the object to be photographed is received by the photo conductive element 10, the element 10 assumes a certain resistance. Under this condition, an unbalance output of the bridge circuit is supplied to the two transistor bases in the differential detector circuit. Depending on the polarity of the input, one of the outputs of the detector circuit produces a voltage, which will be applied to the input-stage transistor 25 or 30 of the switching circuits. The input stage is designed to be differential, and its inversion potential is selectable by the reference potential setting variable resistor 33 or 35. For this reason the dead zone of the switching circuits can be set as appropriate by properly setting the variable resistors 33 and 35 and the resistor 23 provided for setting the operating point of the differential detector circuit.

Assuming that the transistor 25 is turned on by the output of the transistor 15, the transistors 26 and 27 also turn on, applying a voltage to the bases of the transistors 36 and 37 in the astable multivibrator through the output-stage transistor 27. This starts the multivibrator oscillating. Since the resistor 40 is connected to the base of the transistor 37 and the resistor 41 is connected to the base of the transistor 36, if the resistors 40 and 41 have the same value of resistance, the base voltage of the transistor 37 will be higher than that of the transistor 36. As a result, the capacitor 38 will be charged faster than the capacitor 39. Upon completion of charging of the capacitor 39, the transistor 37 becomes conductive, and a current of forward sense flows from the power source 53 to the motor through a circuit of the transistor 50, motor 43 and transistor 37. During the period of the current flow, the capacitor 39 starts being charged; however, since the voltage applied to the capacitor 39 is lower than that applied to the capacitor 38, the capacitor 39 has a longer charging time, during which the motor 43 will be driven in the forward direction. When the capacitor 39 has been charged, the transistor 36 becomes conductive again, which causes a drive current of backward sense to flow in the motor 43, resulting in a braking force applied to the motor 43. However, since the voltage applied to the capacitor 38 is higher, the transistor 37 becomes conductive in a short time period, supplying a drive current of forward sense again. As a result the motor 43 is driven in the forward direction by the pulse current while a braking force is being applied. As in the foregoing, the output terminal of the multivibrator produces rectangular wave outputs. A current of intermittent waveform of predominantly one or the other sense therefore flows in the connected servomotor for turning the motor in the forward or backward direction. As the motor turns, the automatic diaphragm device is actuated to vary the quantity of light incident upon the photosensitive element 2, which in turn changes the state of the bridge circuit toward equilibrium. When the bridge circuit assumes the state of equilibrium, no output is produced by the differential detector circuit, which causes both the switching circuits to turn off, which in turn causes the multivibrator to stop oscillating, which finally causes the motor to stop. The current flowing in the motor is intermittent; therefore, an effective braking effect is applied to the motor and the motor is driven stably. As both the switching circuits assume the off state, the transistor 48 in the indicator circuit turns off after a suitable time delay due to the delay circuit consisting of the resistor 46 and capacitor 47. This causes the display lamp 49 to go off, which indicates that the bridge circuit has assumed the state of equilibrium. If the quantity of incident light is too large or too small to permit the bridge circuit to assume the state of equilibrium, an unbalance output keeps one of the switching circuits turned on, which holds the transistor 48 in the indicator circuit turned on, lighting the lamp for an alarm.

Voltages to be applied to various components of circuits are regulated by the constant current circuits shown in FIG. 2, and all circuits are composed to be symmetrical; therefore, performance is stable against temperature and voltage fluctuations. Furthermore, when the transistor 30 is conductive and the transistor 25 is non-conductive according to the brightness of the object to be photographed, an operating voltage is applied to the right-hand (as viewed facing FIG. 2) terminal of the resistor 42 via the switching transistor 28, thereby making the transistor 36 conductive and in turn driving the motor 43 in the direction opposite to that in the previous case. At the same time the capacitor 38 is charged via the resistors 40 and 42, and in a certain time period determined by the value of $(R_{40} + R_{42}) \cdot C_{38}$ the transistor 37 becomes conductive and the transistor 36 becomes non-conductive, causing a backward drive current to flow in the motor 43. As a result the capacitor 39 starts being charged via the resistor 41, and the transistor 36 becomes conductive in a certain time period determined by the value of $R_{41} \cdot C_{39}$. This therefore causes the motor 43 to be driven in the direction opposite to that in the previous case, and the motor is so maintained until the bridge circuit is balanced by the quantity of light incident on the photosensitive element 10 which is adjusted by the diaphragm 9. As in the foregoing, while the bridge circuit is unbalanced by the state of the photosensitive element 9, an operating voltage is applied to the multivibrator, whereby the multivibrator supplies a rectangular wave drive current of forward or backward sense to the servomotor for driving the motor corresponding to the difference in the duration of the forward or backward pulse, depending on the sense of unbalance of the bridge circuit from the point of equilibrium. When the bridge circuit assumes the state of equilibrium, the multivibrator stops operating, which interrrupts the drive voltage to be applied to the servomotor, eliminating unnecessary consumption of electric power.

As may be seen from the foregoing, although the diaphragm devices 1 and 1D to be driven by the servomotor 43 should overcome their statical friction to be driven at the time of start, the servomotor is given fine driving force and braking force in sequence by drive currents of forward and backward senses during transition of start, as a result of which the diaphragm mechanisms do not receive the vibration effect of their statical friction at the time of start, enabling the mechanisms to move at a uniform speed after the servomotor is supplied with the drive currents and starts turning. Also, after the bridge circuit assumes a state of equilibrium there is no unnecessary electric power consumption because the multivibrator stops oscillating as soon as the bridge circuit assumes the state.

The circuit described above and illustrated in FIG. 2 is composed to be a differential amplifier circuit, in which fluctuation errors due to temperature variations are cancelled among them; therefore the overall error due to temperature variations will be extremely small. Furthermore the transistor circuitry of differential type will be extremely convenient for embodiment into an integrated circuit.

Although the above example of embodiment according to the present invention has the multivibrator drive a servomotor, it will of course be feasible to use a galvanometer, instead of the servomotor, for driving the diaphragm devices by means of a rotor of the galvanometer.

Figure 3:
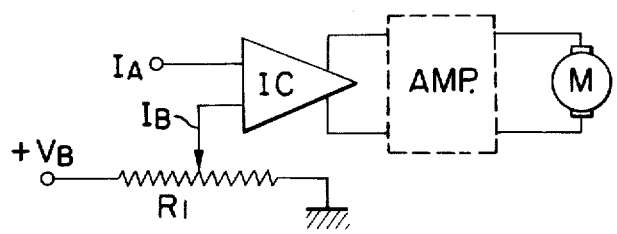
FIG. 3 shows an overall block diagram of an electric circuit for servo system according to the present invention for its utilization with an x–y recorder.

FIG. 3 illustrates a different embodiment of the present invention in which an electric circuit according to the present invention is used with an x–y recorder. Referring to the figure, the triangle designated IC corresponds to a circuit as enclosed with the dotted lines in FIG. 2, terminals $I_A$ and $I_B$ correspond respectively to the input terminals connected to the base electrodes of the transistors 14 and 17 shown in FIG. 2, and a bias voltage $V_B$ is applied beforehand to one end of a variable resistor $R_1$. A motor driving amplifier circuit Amp may be either an ordinary amplifier circuit of known technique or an astable multivibrator circuit as shown in FIG. 2; in the latter case a motor M will be driven with pulse drive current similar to the case of the previously described embodiment. The servomotor M is provided for displacing a recorder pen which is not shown in FIG. 3. The recorder pen which is not shown in FIG. 3 may be that of an x–y recorder of known technique which displaces the pen in either "x" or "y" direction only by means of a servomotor. Generally a pen mechanism to be driven by the motor M has a large force of inertia, and therefore the force of inertia will desirably be measured beforehand and the resistors 33 and 35 in the IC circuit will be so adjusted that the switching transistors 27 and 28 may assume the off state at a little earlier time.

When a certain quantity of recording electricity, that is, a print signal, is supplied to the input terminal $I_A$ of the above-described circuit and the slider of the resistor $R_1$ is moved by a value corresponding to a position to which the unshown recorder pen is to be displaced, the motor M is driven by the IC circuit to move the pen to a required position and to stop the pen there to permit the pen to effect printing, during which time the motor M transports the recorder pen precisely to the required position by taking the force of inertia of the pen mechanism into account.

Figure 4:
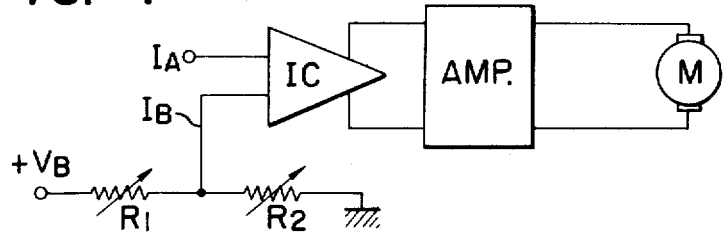
FIG. 4 shows an overall block diagram of an electric circuit for servo system according to the present invention for its utilization with a device to control the velocity of a moving body.

FIG. 4 shows a still another embodiment of the present invention in which an electric circuit according to the present invention is used for controlling the velocity of a moving body. Referring to the figure, IC, Amp, M, $R_1$ and $R_2$ form a circuit similar to that formed by the components carrying similar symbol designations, respectively, in FIG. 3. To an input $I_A$ of the IC circuit, a voltage proportional to the moving velocity of a moving body, for example, a voltage from a tachometer or a voltage proportional to a Pitot-tube pressure, is applied. Resistors $R_1$ and $R_2$ are so preset that the input voltage to be applied to an input terminal $I_B$ may correspond to a specified velocity when the resistor $R_2$ has a standard value, and is so composed that the resistance may be varied corresponding to the degree of acceleration when the acceleration is applied to the moving body. A motor M is coupled to drive a fuel supply valve operating mechanism of a prime mover, for example, a gasoline engine, which drives the moving body so that the r.p.m. of the engine may be increased or decreased according to the rotation of the motor M, by which the velocity of the moving body may be changed. In the composition as described above, the moving body can be operated by the motor M so as to be driven at a certain constant velocity at all times.

Figure 5:
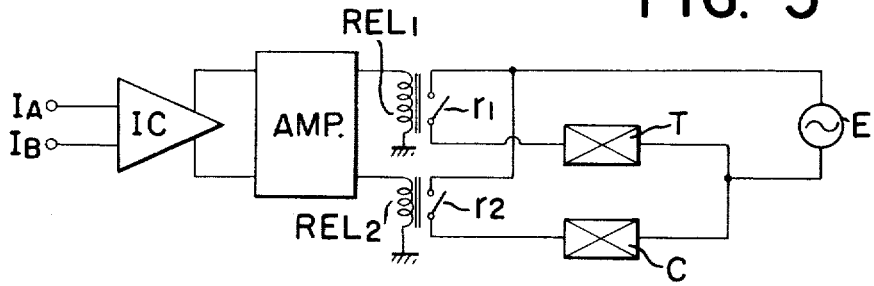
FIG. 5 shows an overall block diagram of an electric circuit for servo system according to the present invention for its utilization with a device to control temperatures.

FIG. 5 shows a still another embodiment of the present invention in which an electric circuit according to the present invention is used with a temperature control device. Referring to the figure, IC represents a circuit as enclosed with the dotted lines in FIG. 2, Amp may be an ordinary amplifier circuit or an astable multivibrator circuit as shown in FIG. 2, $Rel_1$ and $Rel_2$ represent relays connected respectively to outputs of the IC circuit, that is, to transistors 27 and 28 (as shown in FIG. 2), $r_1$ and $r_2$ represent contacts of the above-mentioned relays, respectively, and T, C and E represent a heater, cooler and driving power source, respectively. In the above composition, a voltage corresponding to a temperature to be set is applied to an input terminal $I_B$ of the IC circuit by using, for example, a resistor such as the variable resistor $R_1$ shown in FIG. 3, and a voltage proportional to an actual ambient temperature is applied to another input terminal $I_A$. Then one of the relays $Rel_1$ and $Rel_2$ will be selectively operated via the amplifier circuit Amp, which in turn operates the heater T or the cooler C via the contact $r_1$ or $r_2$ to adjust the ambient temperature so that the quantity of input $I_A$ may become equal to that of input $I_B$ at all times.

In both of the embodiments as illustrated in FIGS. 4 and 5, respectively, the dead zone of the IC circuit is adjustable as desired by adjusting the resistors 33 and 35 in the IC circuit, which characterizes the embodiments by a compensating function with a response delay of the to-be-controlled system and other factors for securing servo action to a required value.

As in the foregoing, the present invention provides an electric circuit which is usable in a variety of servo systems, with the dead zone of the circuit being adjustable so as to compensate for the force of inertia, response delay and other factors, which are taken into account, of the to-be-controlled system, and is therefore very effective for providing an electric circuit for servo system which is capable of servo controlling to an accurate value at all times.

We claim:

1. An electric circuit for a servo system, comprising:
   a first differential circuit to produce a direct-current signal corresponding to a deviation of an input signal from a reference value to be set, said differential circuit having two output terminals;
   two semiconductor switching circuits connected to said output terminals of said differential circuit, respectively, each of said switching circuits including a second differential circuit having a first transistor, the input terminal of which is electrically connected to one of the two output terminals of said first differential circuit, and a second transistor, the input terminal of which is electrically connected to a constant voltage for applying a reference voltage to said second differential circuit and bias level varying means for varying the reference voltage;
   an astable multivibrator having at least one output terminal and input terminals electrically connected to the output terminals of said second differential circuits, said astable multivibrator being constituted so as to produce an alternating pulse current having a variable and reversible direct-current component in response to the output of said second differential circuits and to produce such pulse current only when at least one of said second differential circuits provides an output to an input of said astable multivibrator;
   servo control means electrically connected to the output of said astable multivibrator, said servo control means including means for causing the input to said first differential circuit to approximate said reference voltage,
   whereby upper and lower limits of a non-sensitive range of said servo control means are controllable by said bias level varying means which varies the reference voltage level and in turn operating points of said second differential circuits.

2. A servo system of the balance restoring type comprising:
   an input transducer adapted to produce an input electrical signal;
   a signal modification means adapted to act directly or indirectly on said electrical input signal produced by said input transducer to increase or decrease the electrical signal produced by it;
   an astable multivibrator having two output terminals at which pulse currents of opposite polarity are respectively produced in alternation during operation of said multivibrator, the pulse lengths of the pulse currents being variable by controlling said input transducer so that when the pulse length at one of said terminals is varied, the pulse length at the other terminal is maintained at constant value;
   output transducer means electrically connected between said two output terminals of said astable multivibrator, said output transducer including means to modify said input signal so that it is brought approximately equal to a reference value thereof, at the input of said signal modification means;
   a first differential circuit for producing a direct-current signal corresponding to a deviation of said input signal from the reference value, said differential circuit having a first and a second output terminal;
   two semiconductor switching circuits connected to said two output terminals of said first differential circuit, respectively, each of said of said switching circuits including,
   a second differential circuit having a first transistor, the input terminal of which is electrically connected to one of the two output terminals of said first differential circuit, and a second transistor, the input terminal of which is electrically connected to a constant voltage circuit for applying a reference voltage to said second differential circuit and bias level varying means for varying the reference voltage, and
   an auxiliary switching circuit subject to on-off control in response to the output of said second differential circuit, said auxiliary switching circuit having an input terminal electrically connected to the output terminals of said second differential circuit and an output terminal electrically connected to one of the input terminals of said astable multivibrator, said astable multivibrator being constituted so that it does not operate to produce pulses unless at least one of said auxiliary switching circuits is switched on;
   whereby the non-sensitive range of said multivibrator is adjustable by said bias level varying means, which modulate the output of said input transducer to vary the operating points of said auxiliary switching circuits.

3. An electric circuit according to claim 1, wherein said bias level varying means is provided with a variable resistor connected to said constant voltage circuit, said variable resistor varying the output current of said constant voltage circuit at a predetermined constant voltage.

4. An electric circuit according to claim 1, wherein said differential circuits and said semiconductor switching circuit are each of electrically symmetrical configuration.

5. An electric circuit according to claim 1, wherein said driving means is provided with warning means electrically connected to said semiconductor switching means.

6. An electric circuit according to claim 2, wherein said astable multivibrator includes a differential circuit having a couple of transistors, and a time constant circuit connected to the inputs of said couple of transistors and having a capacitor and resistors different in resistance.

7. An electric circuit according to claim 2, wherein said input transducer is provided with warning means electrically connected to said semiconductor switching means.

8. An electric circuit according to claim 1, wherein said semiconductor switching circuit is provided in the form of an integrated circuit.

9. A servo system according to claim 2, wherein said semiconductor switching circuit is provided in the form of an integrated circuit.

10. A servo system according to claim 2, wherein said bias level varying means is provided with a variable resistor connected in said constant voltage circuit, said variable resistor causing the output current of said constant voltage circuit to vary so as to produce a voltage of predetermined relation to the variable resistor setting.

* * * * *